United States Patent
Shih et al.

(10) Patent No.: US 10,895,949 B2
(45) Date of Patent: Jan. 19, 2021

(54) HEAD MOUNTED DISPLAY AND DISPLAY METHOD FOR EYE-TRACKING CURSOR

(71) Applicant: HTC Corporation, Taoyuan (TW)

(72) Inventors: Bao-Jen Shih, Taoyuan (TW); Fu-Cheng Fan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/600,581

(22) Filed: Oct. 14, 2019

(65) Prior Publication Data

US 2020/0272302 A1  Aug. 27, 2020

Related U.S. Application Data

(60) Provisional application No. 62/808,853, filed on Feb. 22, 2019.

(51) Int. Cl.
*G02B 27/00* (2006.01)
*G06T 7/70* (2017.01)
*G06F 3/0481* (2013.01)
*G06F 3/01* (2006.01)
*G02B 27/01* (2006.01)

(52) U.S. Cl.
CPC ....... *G06F 3/04812* (2013.01); *G02B 27/017* (2013.01); *G06F 3/013* (2013.01); *G02B 2027/0187* (2013.01); *G06T 7/70* (2017.01)

(58) Field of Classification Search
CPC ...... A61B 6/022; A61B 6/466; G02B 27/017; G02B 27/0172; G02B 2027/0178; G02B 27/0179; G02B 2027/0187; G02B 27/0093; G02B 2027/0134; G02B 2027/0132; G06F 3/013; G06F 3/04812; G06F 3/0481; G06T 7/70; G06T 2215/16; H04N 13/344; H04N 13/383; H04N 13/293; G09G 2320/0693; G09G 2340/14
See application file for complete search history.

(56) References Cited

U.S. PATENT DOCUMENTS

| | | | | |
|---|---|---|---|---|
| 6,124,843 A | * | 9/2000 | Kodama | G02B 27/017 345/157 |
| 2014/0333665 A1 | * | 11/2014 | Sylvan | G06F 3/013 345/633 |
| 2015/0062163 A1 | * | 3/2015 | Lee | G06T 19/006 345/633 |
| 2015/0070389 A1 | * | 3/2015 | Goto | G06T 7/00 345/633 |
| 2015/0103096 A1 | * | 4/2015 | Gotoda | G02B 27/0179 345/633 |
| 2015/0205494 A1 | * | 7/2015 | Scott | G06F 3/04845 345/158 |

(Continued)

*Primary Examiner* — Michael J Eurice
(74) *Attorney, Agent, or Firm* — JCIPRNET

(57) ABSTRACT

A head mounted display apparatus and a display method for an eye-tracking cursor are provided. The display method for an eye-tracking cursor includes: projecting a display image, and starting a cursor tracking function; detecting a first staring point of eyes on the display image; setting a first cursor on the first staring point; and detecting a first visual distance between the first staring point and the eyes, and adjusting a dimension of the first cursor according to the first visual distance so that a value of a view angle of the eyes with respect to the first cursor is equal to a preset value.

10 Claims, 6 Drawing Sheets

(56) References Cited

U.S. PATENT DOCUMENTS

| | | | |
|---|---|---|---|
| 2016/0026242 A1* | 1/2016 | Burns | G06T 19/006 345/633 |
| 2016/0026266 A1* | 1/2016 | Douglas | A61B 5/055 345/157 |
| 2016/0027214 A1* | 1/2016 | Memmott | G02B 27/0172 345/633 |
| 2016/0041615 A1* | 2/2016 | Ikeda | G06T 1/00 345/156 |
| 2017/0076503 A1* | 3/2017 | Tamaoki | G06F 3/0482 |
| 2017/0249745 A1* | 8/2017 | Fiala | G02B 27/0093 |
| 2017/0295360 A1* | 10/2017 | Fu | H04N 13/344 |
| 2017/0344112 A1* | 11/2017 | Wilson | G06F 3/0304 |
| 2018/0130227 A1* | 5/2018 | Sato | G06T 7/80 |
| 2018/0217379 A1* | 8/2018 | Nishizawa | G02B 27/017 |
| 2018/0218538 A1* | 8/2018 | Short | G06T 19/006 |
| 2018/0275753 A1* | 9/2018 | Publicover | G06K 9/00604 |
| 2018/0276898 A1* | 9/2018 | Nishizawa | G06F 3/04812 |
| 2018/0314416 A1* | 11/2018 | Powderly | G06F 3/04883 |
| 2019/0187482 A1* | 6/2019 | Lanman | G02B 27/0093 |
| 2019/0237044 A1* | 8/2019 | Day | G09G 5/08 |
| 2019/0377487 A1* | 12/2019 | Bailey | G06F 3/0346 |

\* cited by examiner

HEAD MOUNTED DISPLAY AND DISPLAY METHOD FOR EYE-TRACKING CURSOR

CROSS-REFERENCE TO RELATED APPLICATION

This application claims the priority benefit of U.S. provisional application Ser. No. 62/808,853, filed on Feb. 22, 2019. The entirety of the above-mentioned patent application is hereby incorporated by reference herein and made a part of this specification.

BACKGROUND OF THE INVENTION

Field of the Invention

The disclosure relates to a head mounted display apparatus and a display method for an eye-tracking cursor, in particular, to a head mounted display apparatus and a display method for an eye-tracking cursor capable of improving visual comfort.

Description of Related Art

With the focus on multimedia service nowadays, high-quality display effect improvement is an important subject for an electronic device. Therefore, three-dimensional head mounted display apparatuses of so-called virtual reality, augmented reality and mixed reality emerge.

In order to provide a high-quality interaction mode for a user in a three-dimensional space, the current head mounted display apparatus may display a cursor along with a staring point of the user's eyes in a three-dimensional scene. According to the display mode of the eye-tracking cursor, in the conventional technical fields, a cursor with the same size is displayed in a two-dimensional display mode no matter whether the user fixes the eyes on remote or near objects. By using this display mode, a condition of different visual distances between the displayed cursor and the gazed object may be caused, visual discomfort of the user may be caused, and the performance of the head mounted display apparatus is reduced.

SUMMARY OF THE INVENTION

The invention provides a head mounted display apparatus and a display method for an eye-tracking cursor thereof, capable of improving visual comfort of a user.

The display method for the eye-tracking cursor provided by the invention includes the following steps: projecting a display image, and starting a cursor tracking function; detecting a first staring point of eyes on the display image; setting a first cursor on the first staring point; and detecting a first visual distance between the first staring point and the eyes, and adjusting a dimension of the first cursor according to the first visual distance so that a value of a view angle of the eyes with respect to the first cursor is equal to a preset value.

The head mounted display apparatus of the invention includes a display and a controller. The display is configured to project a display image. The controller is coupled with the display, and is configured to start a cursor tracking function, detect a first staring point of eyes on the display image, enable the display to set a first cursor on the first staring point and detect a first visual distance between the first staring point and the eyes and enable the display to adjust a dimension of the first cursor according to the first visual distance so that a value of a view angle of the eyes with respect to the first cursor is equal to a preset value.

Based on the above, according to the invention, the dimension of the cursor is adjusted according to the visual distance between the staring point of the eyes and the eyes. Values of view angles of the eyes with respect to the cursor at different visual distances can all be equal to an identical preset value, so that the visual comfort of the user is improved.

To make the features and advantages of the invention clear and easy to understand, the following gives a detailed description of embodiments with reference to accompanying drawings.

DESCRIPTION OF THE EMBODIMENTS

Figure 1:
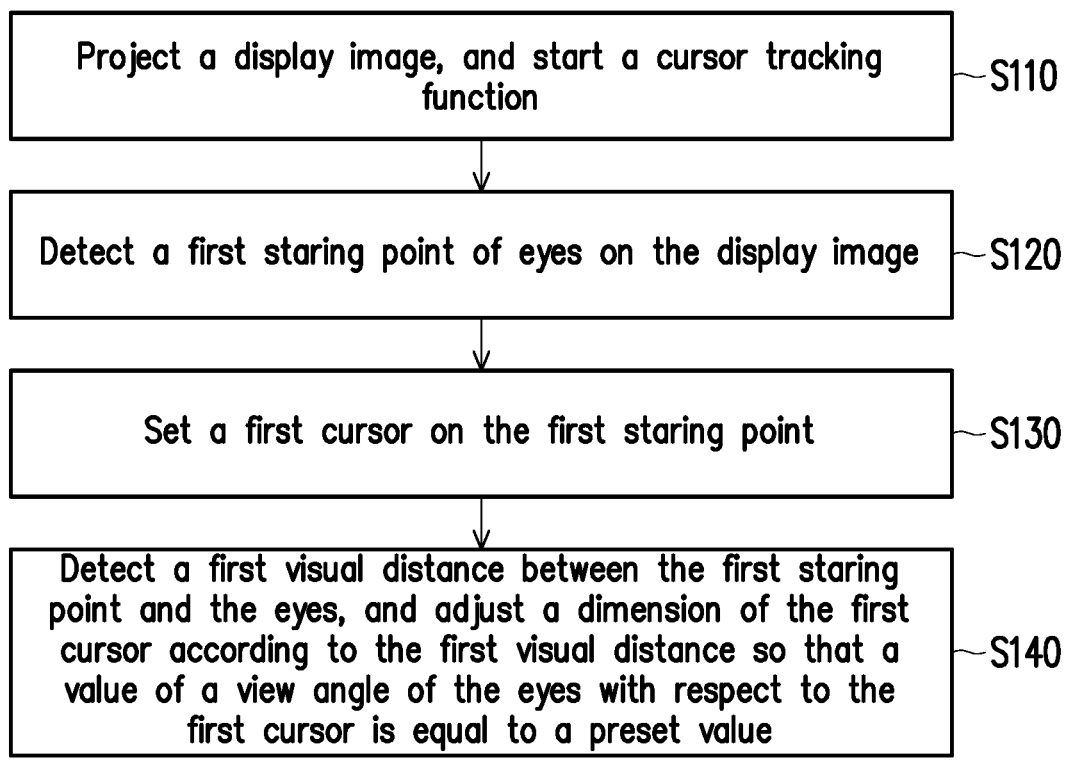
FIG. 1 shows a flowchart of a display method for an eye-tracking cursor according to an embodiment of the invention.

Referring to FIG. 1, FIG. 1 shows a flowchart of a display method for an eye-tracking cursor according to an embodiment of the invention. The display method for the eye-tracking cursor according to the embodiment of the invention is applicable to a head mounted display apparatus, wherein in Step S110, the head mounted display apparatus may project a display image, and start a cursor tracking function. After the cursor tracking function is started, a user may perform cursor operation and control action through a staring point of eyes. Then, in Step S120, the head mounted display apparatus may detect a first staring point generated from the user's eyes on the display image. In Step S130, a first cursor is set at a position corresponding to the first staring point on the display image.

In addition, in the Step S140, the head mounted display apparatus may detect a first visual distance between the first staring point and the eyes, and adjust a dimension of the first cursor according to the first visual distance. The dimension of the cursor is adjusted, so that a value of a view angle of the eyes with respect to the first cursor is equal to a first preset value.

It should be noted that, in the present embodiment, when the staring point of the user's eyes is moved to a second staring point different from the first staring point, the head mounted display apparatus detects a second visual distance between the second staring point and the eyes. Under the condition that the second visual distance and the first visual distance are different, a dimension of a second cursor to be set may be adjusted according to the second visual distance. The key point is that when the adjusted second cursor is set at the position of the second staring point, a value of a view angle of the eyes with respect to the second cursor is fixed and is equal to the preset value.

From the above illustration, no matter which of a plurality of positions with different visual distances on the display image the staring point of the user's eyes falls on, by setting the cursor set on the staring point by the head mounted display apparatus so that the view angle of the eyes with respect to the set cursor is fixed at the identical preset value, the visual comfort of the user may be effectively improved.

For detailed illustration, in the embodiment of the invention, the dimension of the cursor set by the head mounted display apparatus has positive correlation to the visual distance generated by the staring point of the eyes. That is to say, when the visual distance is increased, the dimension of the cursor set by the head mounted display apparatus may be increased. Relatively, when the visual distance is decreased, the dimension of the cursor set by the head mounted display apparatus may be deceased.

In the present embodiment, the dimension of the cursor may be obtained according to the preset value of the view angle and the visual distance through calculation of a trigonometric function. Of course, the dimension of the cursor may be precalculated on the basis of the set preset value of the view angle and the corresponding relationship between various different visual distances and various different dimensions of the cursor, and may be pre-stored in a lookup table. The head mounted display apparatus may perform lookup according to the lookup table, and the dimension of the cursor to be adjusted may be obtained quickly.

Figure 2:
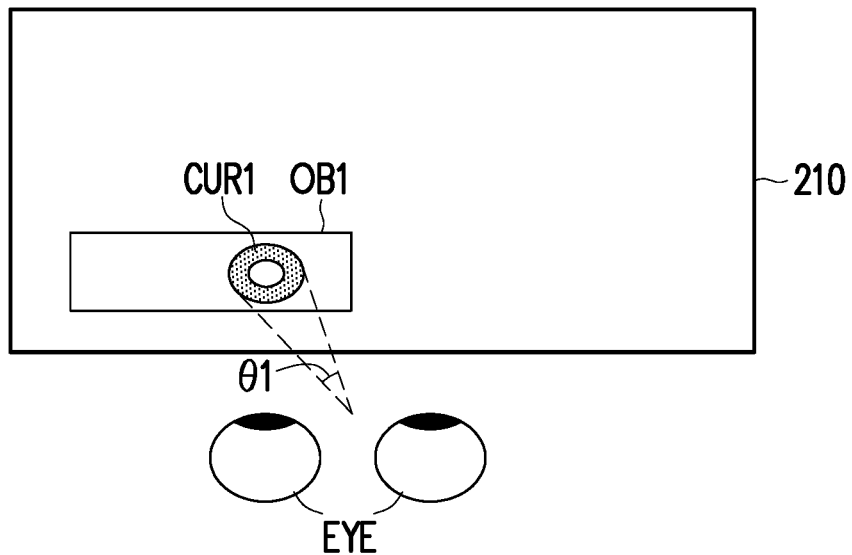
FIG. 2 and FIG. 3 show schematic diagrams of an implementation mode of a display method for an eye-tracking cursor according to the embodiment of the invention.
Figure 3:
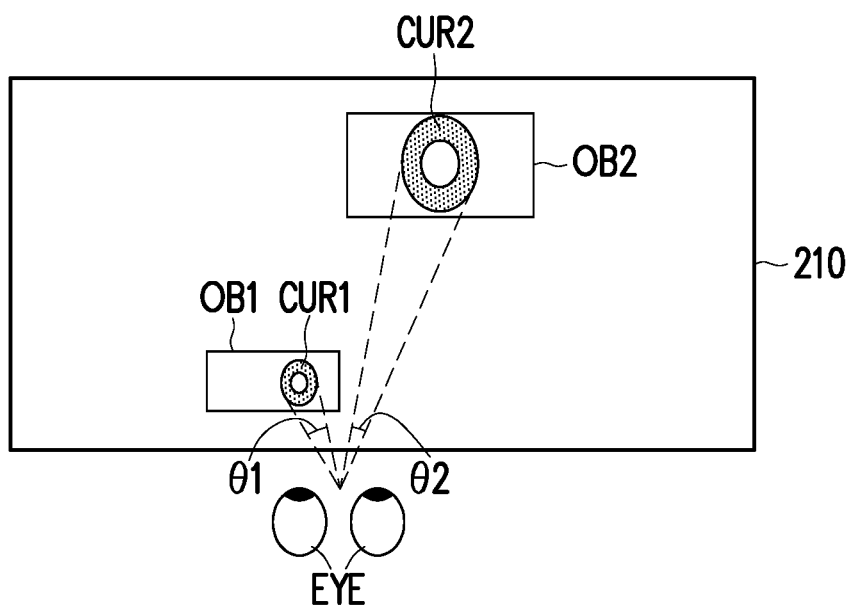

Referring to FIG. 2 and FIG. 3, FIG. 2 and FIG. 3 show schematic diagrams of an implementation mode of the display method for the eye-tracking cursor according to the embodiment of the invention, wherein in FIG. 2, when a staring point of the user's eyes EYE falls on a first object OB1 on a display image 210, the head mounted display apparatus adjusts the dimension of a cursor CUR1 according to a visual distance by detecting the visual distance between the staring point and the eyes EYE, and enables the cursor CUR1 to be set on the staring point (the object OB1) of the eyes EYE, wherein a view angle formed by the eyes EYE with respect to the cursor CUR1 is equal to $\theta 1$.

Then, in FIG. 3, the staring point of the user's eyes EYE is changed to fall on a valid object OB2, the head mounted display apparatus adjusts the dimension of a cursor CUR2 according to the visual distance by detecting the visual distance between the staring point and the eyes EYE, and enables the cursor CUR2 to be set on the staring point (the object OB1) of the eyes EYE at this moment. It should be noted that a view angle formed by the eyes EYE with respect to the cursor CUR2 is equal to $\theta 2$, wherein the view angle $\theta 2$ is equal to the view angle $\theta 1$, and the view angle $\theta 2$ and the view angle $\theta 1$ may be equal to a preset value set in advance.

It should be noted that the visual distance between the eyes EYE and the cursor CUR1 is smaller than the visual distance between the eyes EYE and the cursor CUR2, so that the dimension of the cursor CUR1 may be smaller than the dimension of the cursor CUR2.

From the above illustration, in the embodiment of the invention, when the staring point of the eyes EYE moves, the head mounted display apparatus may dynamically adjust the dimensions of the cursors CUR1 and CUR2 to be set according to the visual distances between the staring points and the eyes, and enable the eyes EYE to form the identical view angle (equal to the preset value) on the cursors CUR1 and CUR2. Therefore, a visual discomfort phenomenon of the user due to different visual distances between the displayed cursor and the gazed object may be avoided, and the visual comfort is improved.

Additionally, in the present embodiment, the objects OB1 and OB2 are valid objects with boundaries. The cursors CUR1 and CUR2 may be directly and respectively arranged on the objects OB1 and OB2.

Figure 4:
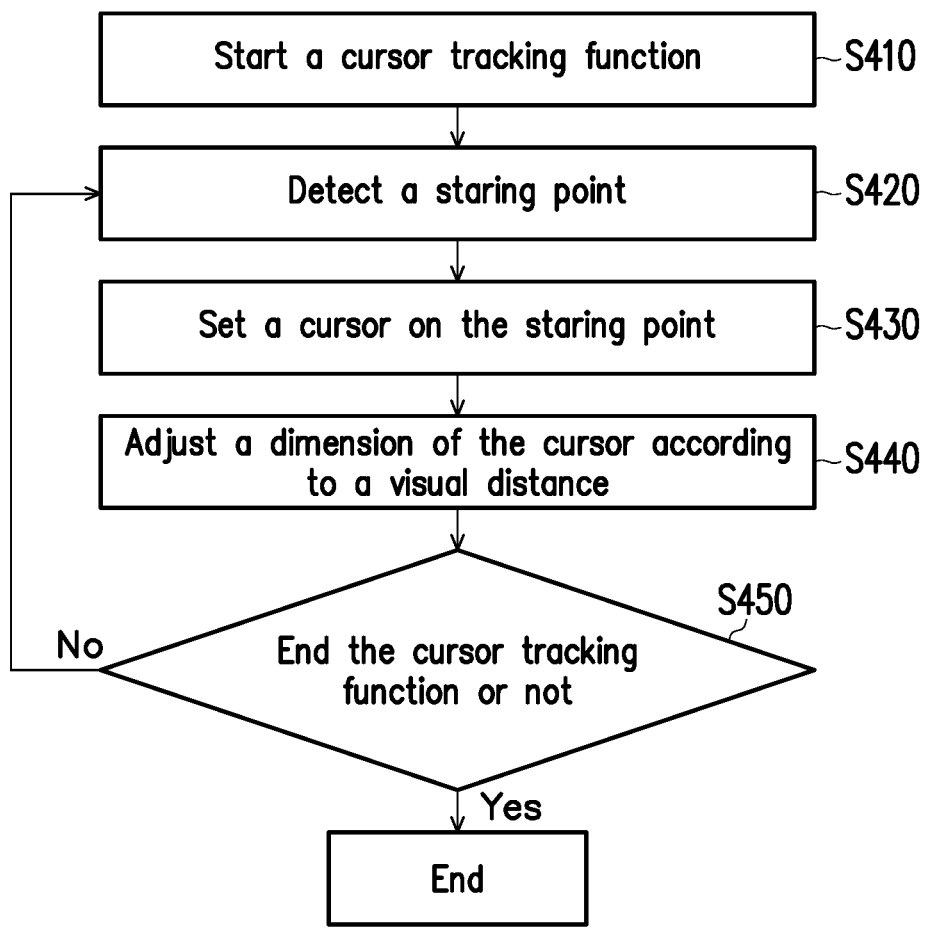
FIG. 4 shows a flowchart of a display method for an eye-tracking cursor according to an embodiment of the invention.

Referring to FIG. 4, FIG. 4 shows a flowchart of a display method for an eye-tracking cursor according to an embodiment of the invention, and the display method is applicable to the head mounted display apparatus. In Step S410, the head mounted display apparatus starts the cursor tracking function. The head mounted display apparatus detects the staring point generated from the eyes in Step S420, and sets the cursor on the staring point in Step S430. In addition, in Step S440, the head mounted display apparatus adjusts and sets the dimension of the cursor according to the visual distance between the staring point and the eyes.

In Step S450, the head mounted display apparatus determines whether the cursor tracking function is completed or not, and ends the process if the determination result is YES. Relatively, if the determination result is NO, the Step S420 is executed again.

Figure 5:
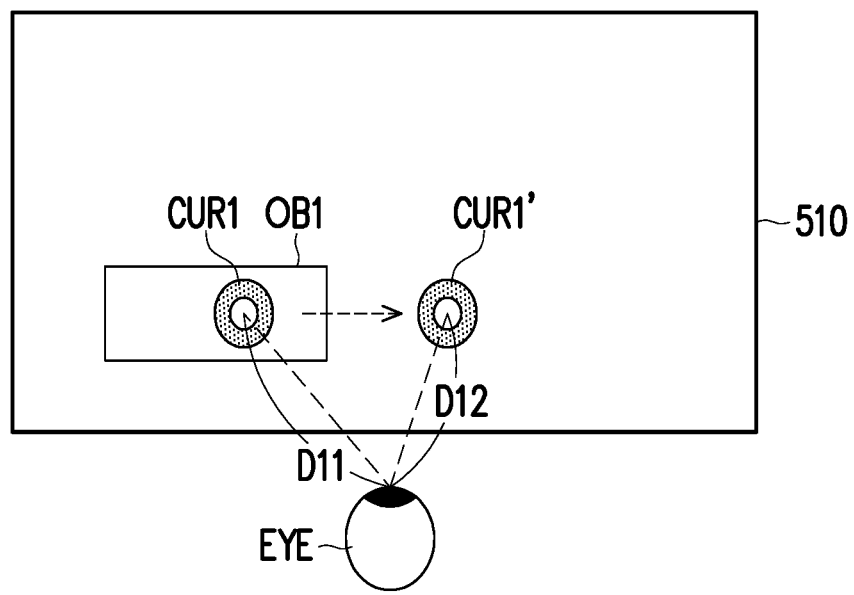
FIG. 5 and FIG. 6 show schematic diagrams of an implementation mode of a display method for an eye-tracking cursor according to another embodiment of the invention.
Figure 6:
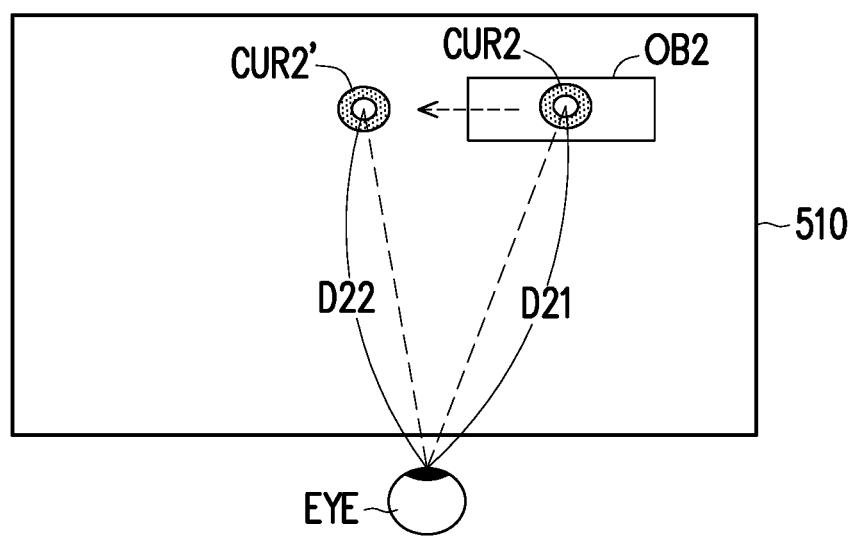

Referring to FIG. 5 and FIG. 6, FIG. 5 and FIG. 6 show schematic diagrams of an implementation mode of the display method for the eye-tracking cursor according to another embodiment of the invention, wherein in FIG. 5, the staring point of the user's eyes EYE firstly falls on the object OB1 in a display image 510, wherein the object OB1 is a valid object with a boundary. Meanwhile, the head mounted display apparatus may detect a visual distance D11 between the eyes EYE and the staring point, set the dimension of the cursor CUR1 according to the visual distance D11, and set the cursor CUR1 on the object OB1. Additionally, the head mounted display apparatus stores the visual distance D11 as a reference distance.

Then, the staring direction of the user's eyes EYE changes, and no valid object exists in the staring direction of the user's eyes EYE. That is to say, the staring point of the eyes EYE falls on an invalid object in the display image 510. In the present embodiment, the invalid object is an object without a boundary in the display image 510, such as the sky and black holes. Meanwhile, the head mounted display apparatus may perform the setting action of a cursor CUR1' in the staring direction of the eyes EYE according to the previously set reference distance (equal to the visual distance D11). In the present embodiment, a visual distance D12 between the cursor CUR1' and the eyes EYE is equal to the visual distance D11 between the cursor CUR1 and the eyes EYE. Additionally, a dimension of the cursor CUR1' and the dimension of the cursor CUR1 are substantially identical.

In FIG. 6, the staring point of the eyes EYE of the user firstly falls on the object OB2 in the display image 510, and the head mounted display apparatus detects a visual distance D21 between the eyes EYE and the staring point, and sets the cursor CUR2 at a position corresponding to the staring point of the eyes EYE on the object OB2, wherein the dimension of the cursor CUR2 is set according to the visual distance D21. In the present embodiment, since the view angle of the eyes EYE with respect to the cursor CUR2 is fixedly set to be the preset value, compared with the embodiment in FIG. 5, the dimension of the cursor CUR2 may be greater than the dimension of the cursor CUR1 on the premise that the visual distance D21 is greater than the visual distance D11. Additionally, the head mounted display apparatus stores the visual distance D21 as the reference distance.

Next, the staring direction of the user's eyes EYE changes, and no valid object exists in the staring direction of the user's eyes. That is to say, the staring point of the eyes EYE falls on an invalid object in the display image 510. Meanwhile, the head mounted display apparatus may perform the setting action of a cursor CUR2' in the staring direction of the eyes EYE according to the previously set reference distance (equal to the visual distance D21). In the present embodiment, a visual distance D22 between the cursor CUR2' and the eyes EYE equals to the visual distance D21 between the cursor CUR2 and the eyes EYE. Additionally, a dimension of the cursor CUR2' and the dimension of the cursor CUR2 are substantially identical.

Figure 7:
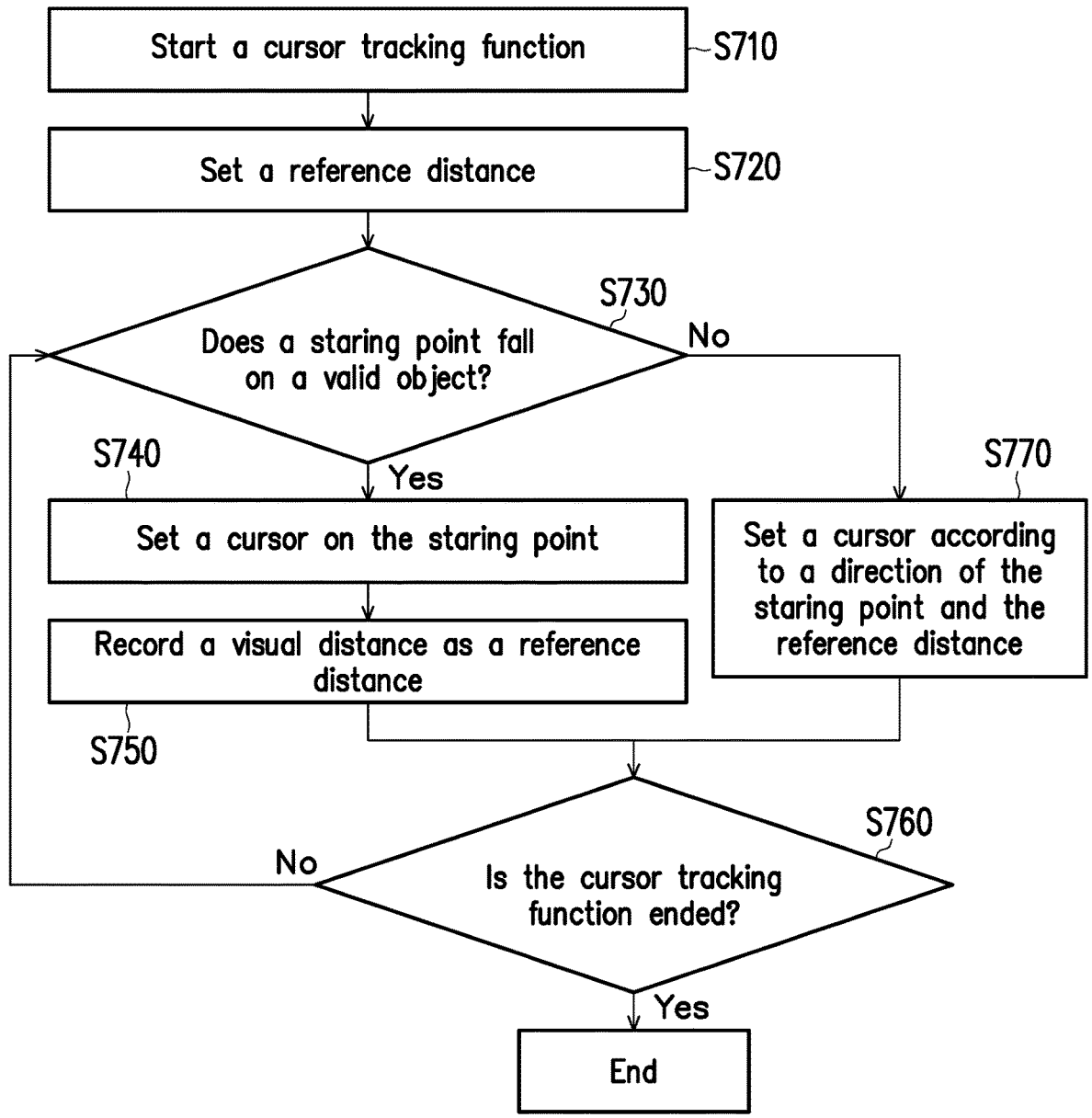
FIG. 7 shows a flowchart of a display method for an eye-tracking cursor according to another embodiment of the invention.

Referring to FIG. 7, FIG. 7 shows a flowchart of a display method for an eye-tracking cursor according to another embodiment of the invention. In Step S710, a head mounted display apparatus starts a cursor tracking function. In Step S720, the head mounted display apparatus may firstly set a reference distance. Then, in Step S730, the head mounted display apparatus determines whether the staring point of the eyes falls on a valid object or not, and Step S740 is executed when the staring point of the eyes falls on the valid object. In Step S740, the head mounted display apparatus detects a visual distance between the staring point and the eyes, and sets a cursor on the staring point according to the visual distance. Next, in Step S750, the detected visual distance is recorded as the reference distance.

Returning to Step S730, when the staring point of the eyes changes and does not fall on the valid object, the head mounted display apparatus may execute Step S770, and set the cursor according to the staring direction of the eyes and the reference distance set at this moment.

Additionally, when a condition that the cursor tracking function is completed is determined in Step S780, the process is completed. Relatively, when a condition that the cursor tracking function is not completed is determined in Step S780, the Step S730 is executed again.

Figure 8:
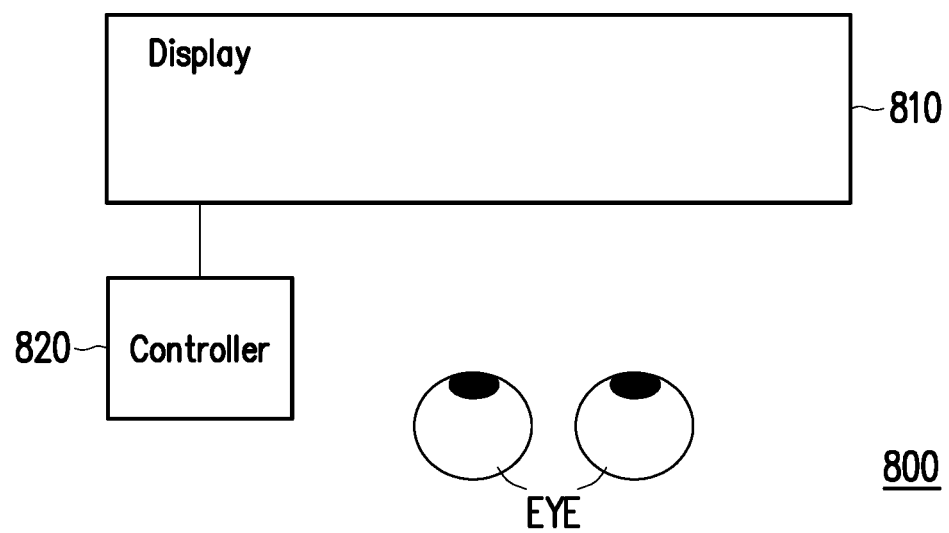
FIG. 8 shows a schematic diagram of a head mounted display apparatus according to an embodiment of the invention.

Referring to FIG. 8, FIG. 8 shows a schematic diagram of a head mounted display apparatus according to an embodiment of the invention. The head mounted display apparatus 800 includes a display 810 and a controller 820. The controller 820 is coupled to the display 810, and obtains a staring point of eyes EYE by detecting an eye movement state of the user's eyes EYE. After a cursor tracking function is started, the controller 820 enables the display 810 to perform a setting action of the cursor in a display image according to the methods and the processes in FIG. 1, FIG. 4 and FIG. 7. It is worth mentioning that a view angle generated from the cursor set by the display 810 on the display image with respect to the eyes EYE is substantially equal to the preset value. Through the fixed view angle, the visual comfort may be effectively improved when the user performs cursor tracking and observation.

In the embodiment of the invention, the controller 820 may be a processor with computation capability. Alternatively, the controller 820 may be a hardware circuit designed through HDL (Hardware Description Language) or designed in other modes of digital circuits familiar to any person having general knowledge in the art by means of FPGA (Field Programmable Gate Array), CPLD (Complex Programmable Logic Device) or ASIC (Application-specific Integrated Circuit). Additionally, the controller 820 may perform detection action on the staring point and staring direction of the eyes EYE by using an eye-tracking technology familiar to a person with general knowledge in the art, and may accordingly perform detection action of the visual distance, and there is no specific limitation.

In conclusion, in the invention, the visual distance between the eyes and the cursor is detected, and the dimension of the cursor is set and adjusted according to the visual distance. By adjusting the dimension of the cursor, the view angle of the cursor with respect to the eyes can be a fixed preset value. The visual comfort of the user can be effectively improved on the premise that the view angle is not changed due to a change in the visual distance.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A display method for an eye-tracking cursor, comprising:
   projecting a display image by a display, and starting a cursor tracking function;
   detecting a first staring point of eyes by an eye-tracking action performed by a controller on the display image;
   setting a first cursor on the first staring point;
   detecting a first visual distance by the controller between the first staring point and the eyes, and adjusting a dimension of the first cursor according to the first visual distance so that a value of a view angle of the eyes with respect to the first cursor is equal to a preset value;
   detecting a second staring point of the eyes, and setting a second cursor on the second staring point;
   detecting a second visual distance between the second staring point and the eyes, wherein the first visual distance and the second visual distance are different; and
   adjusting a dimension of the second cursor according to the second visual distance so that a value of a view angle of the eyes with respect to the second cursor is equal to the preset value as the value of a view angle of the eyes with respect to the first cursor.

2. The display method according to claim 1, wherein when the second visual distance is greater than the first visual distance, the dimension of the second cursor after adjustment is greater than the dimension of the first cursor after adjustment.

3. The display method according to claim 1, wherein the first staring point is located on a first valid object in the display image, the first valid object being an object with a boundary.

4. The display method according to claim 3, further comprising:
   recording the first visual distance as a reference distance;
   detecting a second staring point of the eyes, wherein the second staring point is located on a first invalid object in the display image, the first invalid object being an object without a boundary; and
   setting the first cursor on the second staring point according to the reference distance.

5. The display method according to claim 4, further comprising:
   detecting a third staring point of the eyes, and displaying a second cursor on the third staring point, wherein the third staring point is located on a second valid object in the display image;

detecting a second visual distance between the third staring point and the eyes, and adjusting a dimension of the second cursor according to the second visual distance, so that a value of a view angle of the eyes with respect to the second cursor is equal to the preset value;

recording the second visual distance as the reference distance;

detecting a fourth staring point of the eyes, wherein the fourth staring point is located on a second invalid object in the display image, the second invalid object being an object without a boundary; and setting the second cursor on the fourth staring point according to the reference distance.

6. A head mounted display apparatus, comprising:

a display, configured to project a display image; and a controller, coupled with the display, and configured to:
    start a cursor tracking function;
    detect a first staring point of eyes on the display image;
    enable the display to set a first cursor on the first staring point;
    detect a first visual distance between the first staring point and the eyes, enable the display to adjust a dimension of the first cursor according to the first visual distance so that a value of a view angle of the eyes with respect to the first cursor is equal to a preset value;
    detect a second staring point of the eyes, and enable the display to set a second cursor on the second staring point;
    detect a second visual distance between the second staring point and the eyes, wherein the first visual distance and the second visual distance are different; and
    adjust a dimension of the second cursor according to the second visual distance so that a value of a view angle of the eyes with respect to the second cursor are same value as the preset value as the value of a view angle of the eyes with respect to the first cursor.

7. The head mounted display apparatus according to claim 6, wherein when the second visual distance is greater than the first visual distance, the dimension of the second cursor after adjustment is greater than the dimension of the first cursor after adjustment.

8. The head mounted display apparatus according to claim 6, wherein the first staring point is located on a first valid object in the display image, the first valid object being an object with a boundary.

9. The head mounted display apparatus according to claim 8, wherein the controller is further configured to:
    record the first visual distance as a reference distance;
    detect a second staring point of the eyes, wherein the second staring point is located on a first invalid object in the display image, the first invalid object being an object without a boundary; and
    enable the display to set the first cursor on the second staring point according to the reference distance.

10. The head mounted display apparatus according to claim 8, wherein the controller is further configured to:
    detect a third staring point of the eyes, and display a second cursor on the third staring point, wherein the third staring point is located on a second valid object in the display image;
    detect a second visual distance between the third staring point and the eyes, and adjust a dimension of the second cursor according to the second visual distance so that a value of a view angle of the eyes with respect to the second cursor is equal to the preset value;
    record the second visual distance as the reference distance;
    detect a fourth staring point of the eyes, wherein the fourth staring point is located on a second invalid object in the display image, the second invalid object being an object without a boundary; and
    enable the display to set the second cursor on the fourth staring point according to the reference distance.

* * * * *